United States Patent [19]

Mahlich et al.

[11] Patent Number: 4,889,041

[45] Date of Patent: Dec. 26, 1989

[54] ELECTRIC APPLIANCE FOR MAKING HOT BEVERAGES

[75] Inventors: Gotthard C. Mahlich, Kronberg; Michael Borgmann, Solingen, both of Fed. Rep. of Germany

[73] Assignee: Robert Krups Stiftung & Co. KG, Solingen, Fed. Rep. of Germany

[21] Appl. No.: 239,192

[22] Filed: Aug. 31, 1988

[30] Foreign Application Priority Data

Sep. 5, 1987 [DE] Fed. Rep. of Germany ....... 3729773

[51] Int. Cl.⁴ .............................................. A47J 31/00
[52] U.S. Cl. ........................................ 99/285; 99/286; 99/295; 99/298
[58] Field of Search ................. 99/279, 285, 290, 286, 99/298, 323.3, 323.1, 295, 307, 300, 304, 484; 426/433; 38/77.6, 77.83, 77.2, 77.3

[56] References Cited

U.S. PATENT DOCUMENTS 4,070,956 1/1978 Brown ................................ 99/323.3
4,565,019 1/1986 Cavalli ................................ 38/77.6

Primary Examiner—Robert W. Jenkins
Attorney, Agent, or Firm—Peter K. Kontler

[57] ABSTRACT

An electric coffee or tea maker wherein a supply of water softening agent is installed in the region of the outlet of a water tank so that the stream of water which is discharged by the tank when the maker is in use is acted upon by the softening agent before it enters the conduit or conduits which convey the stream through an electric heater and thereupon into a receptacle for comminuted coffee beans or tea leaves. This prevents gradual clogging of the conduits with boiler scale. The supply of softening agent can be replenished or replaced. This is determined by looking through an observation window so as to ascertain the color of the softening agent. The color is indicative of the condition of the softening agent, i.e., whether or not the softening agent is still capable of performing its water-softening function.

22 Claims, 3 Drawing Sheets

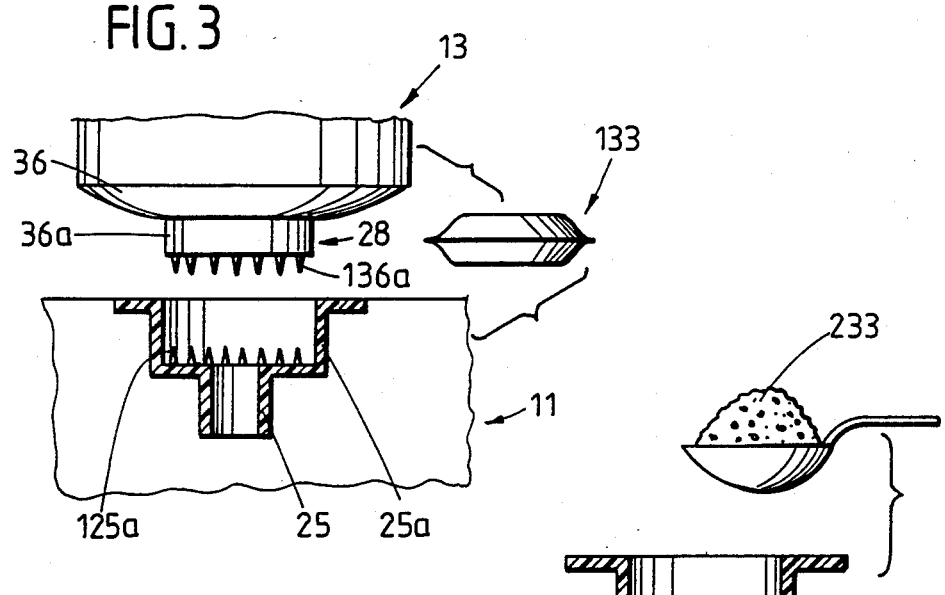
FIG. 3
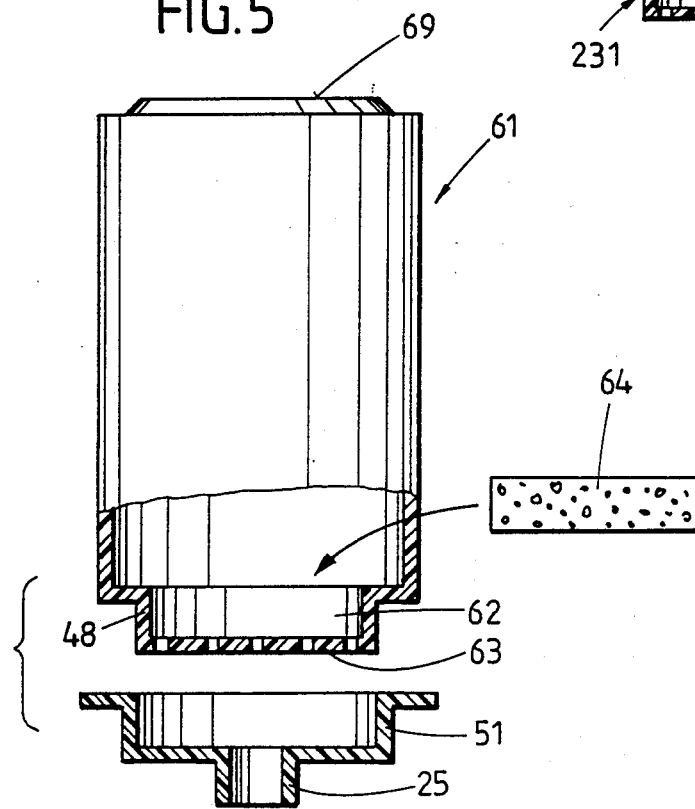
FIG. 4
FIG. 5

ELECTRIC APPLIANCE FOR MAKING HOT BEVERAGES

CROSS-REFERENCE TO RELATED CASE

Certain features of the electric appliance of the present invention are similar to those of the appliance which is disclosed in our commonly owned copending patent application Ser. No. 239,211 filed Aug. 31, 1988 for "Water-consuming electric appliance with water softening facility".

BACKGROUND OF THE INVENTION

The invention relates to electric appliances in general, and more particularly to improvements in electric appliances which consume water while in use. Typical examples of such appliances are coffee, espresso and capuccino making machines and tea making machines. For the sake of simplicity and convenience, the invention will be described with reference to electric coffee making machines; however, it is to be understood that the invention can be embodied with similar or equal advantage in many other types of water-consuming appliances for the making of hot beverages.

An electric coffee maker normally comprises a housing which is provided with a vessel for a supply of tap water. An electric heater is installed in the housing to heat a stream of water which flows from the vessel into a receptacle for comminuted coffee beans. The thus obtained beverage can be dispensed into a coffee can or another suitable receptacle which can rest on a warming plate. As a rule, the vessel is filled with tap water which normally contains various gases as well as salts drawn from the soil or from rocks with which the water comes in contact prior to entering a reservoir serving as a source of water for the taps in a dwelling or in another establishment. Salts which are customarily found in tap water include sodium bicarbonate, sodium sulfate and magnesium bicarbonate. The percentage of sodium and magnesium salts determines the hardness of water which is normally measured in degrees, such as the English or Clark degrees, the German degrees and the French degrees. The number of degrees is higher if the water is harder, and vice versa.

Hardness of water which is used in an electric coffee making machine exerts a great influence upon the useful life of such appliance. The reason is that heating entails a decomposition of water into its constituents, and these constituents (especially carbonates) deposit on the adjacent surfaces in the form of scale. The scale is an insulator of heat so that the energy requirements of the machine increase as the thickness of scale increases. In addition, scale gradually clogs various pipes, conduits and other components which define relatively narrow paths for the flow of water in the interior of a coffee making machine so that the rate of water flow becomes highly unpredictable. In fact, scale can completely clog the conduits so that the machine must be discarded even though many or all other component parts are still ready for use.

Heretofore known proposals to eliminate scale include the utilization of various acids. Thus, if the scale gathers on parts which are made of copper, brass or certain other metals, it can be removed with diluted lactic or acetic acid. The makers recommend periodic descaling of such appliances; the length of intervals between successive descaling operations depends upon the hardness of water which is used in the coffee making machines.

It is further known to employ so-called calcification or hardness indicators in the form of mechanical, electric or electronic instruments which contribute significantly to complexity and cost of the appliances. Moreover, presently known instruments of such character are not overly reliable which is another reason why they failed to gain widespread acceptance in the relevant industry. Reference may be had, for example, to German Offenlegungsschrift No. 32 23 969 which discloses an indicator serving to inform the user of a coffee making machine that a decalcification of conduits is advisable or necessary. The operation of the indicator which is disclosed in this published German patent application is based on the recognition that the transfer of heat between the electric heater and water which flows from the vessel for tap water to the receptacle for comminuted coffee beans is less satisfactory when the internal surface of the conduit serving to convey water through the heater is coated with boiler scale. Thus, when the internal surface of such conduit is coated with scale, the temperature of the water heater rises and the rise of temperature is proportional to the quantities of scale in the conduit. A discrete (additional) thermostat is provided to monitor the temperature of the water heater and to initiate the generation of a signal, e.g., by causing a lamp to light up, when the temperature of the water heater rises to a preselected value which is indicative of excessive deposition of scale in the conduit. The lamp thus informs the person in charge that a decalcification is in order.

A drawback of the just described indicators is that they are not reliable. For example, an overheating of the water heater can also take place when the supply of water in the conduit which is to convey water through the heater is evaporated in its entirety. This can induce the operator to carry out a decalcifying or scale-removing operation before such operation becomes necessary. Therefore, the published German patent application further proposes that the calcification indicator be combined with an electronic clock having a memory to store information pertaining to the interval of time which normally elapses between the instant of turning on the electric heater and first disconnection of the heating element from its energy source by the customary thermostat of the machine. The clock is designed to initiate the generation of a signal which denotes that a decalcification of the conduit or conduits in the machine is necessary if the temperature of the heating element rises beyond an acceptable value prior to elapse of the aforementioned interval. Thus, the clock serves as a means for taking into account that the interval of time which elapses for complete evaporation of a given quantity of water is longer if the conduits contain substantial quantities of scale than if the conduits are free to permit water to flow therein at the desired or expected rate. This is due to the aforediscussed fact that the exchange of heat between the heating device and a stream of water which flows therethrough is less satisfactory if the internal surface or surfaces of the conduit or conduits which convey water through the heater are coated with layers of scale. In other words, the interval of time which is required for complete evaporation of a given quantity of tap water is prolonged proportionally with the quantity of scale which coats the internal surface or surfaces of the conduit or conduits leading from the vessel for a supply of tap water to the receptacle for comminuted coffee beans. The provision of an electronic clock contributes to reliability of the indicator; however, such clock also contributes significantly to the initial and maintenance cost of the appliance because it is expensive and complex and hence prone to malfunction. The total number of parts in such indicators and in the associated clocks is large, and their space requirements are excessive.

OBJECTS OF THE INVENTION

An object of the invention is to provide a coffee making or like machine with novel and improved means for preventing the deposition of scale in or on components which are likely to be adversely affected by scale or wherein deposits of scale are likely to adversely affect the operation, energy requirements and/or useful life of the entire appliance.

Another object of the invention is to provide an appliance wherein only the vessel for fresh water is apt to gather scale but all other parts which come in contact with water are reliably insulated from scale and/or from constituents which are likely to cause the deposition of scale.

A further object of the invention is to provide a novel and improved coffee making, tea making or like machine wherein the parts which could be adversely affected by boiler scale are contacted solely by soft water.

An additional object of the invention is to provide a novel and improved method of softening water in electric coffee makers and like machines.

Still another object of the invention is to provide an appliance wherein the intensity of softening of tap water can be monitored in a simple and timesaving manner without necessitating even partial dismantling of the appliance and wherein the intensity of softening can be enhanced whenever and as often as necessary.

A further object of the invention is to provide a novel and improved vessel for storage of water in water-consuming electric appliances.

Another object of the invention is to provide a novel and improved housing for water tanks which are used in coffee makers and other types of water-consuming appliances.

An additional object of the invention is to provide a simple and inexpensive method of preventing deposition of scale in conduits, pipes and analogous water conveying parts of a coffee maker or another water-consuming appliance.

A further object of the invention is to provide prefabricated inserts which consist of, or which contain, one or more softening agents and can be used in appliances of the above outlined character.

Another object of the invention is to provide novel and improved disposable water tanks for use in water-consuming appliances.

SUMMARY OF THE INVENTION

The invention is embodied in an electric machine for making hot beverages, such as coffee and/or tea. The improved machine comprises a vessel which serves to store a body of water, such as magnesium- and/or calcium-containing tap water, and has a water outlet, a receptacle which serves to contain a flavoring agent (such as comminuted coffee beans or tea leaves), means for conveying water from the outlet of the vessel to the receptacle so that the thus conveyed water contacts the flavoring agent, and means for softening water in the region of the outlet of the vessel. The machine normally further comprises means for heating water intermediate the vessel and the receptacle.

The softening means contains a supply of water softening agent which is contacted by water in the region of the outlet and the composition of which is or can be such that at least one of its characteristics (for example, its color) changes when its water softening capacity is reduced or exhausted. The machine wherein the softening means employs such water softening agent is preferably further provided with an observation facility for the supply of water softening agent. This facility is preferably provided with means for permitting visual determination of the at least one characteristic.

The softening means can comprise a chamber for the supply of softening agent and this chamber can be disposed beneath and can communicate with the outlet of the vessel. Such softening means can further comprise a filter which is adjacent the chamber and defines a path for the flow of softened water toward the receptacle, and wall means which surrounds the chamber and includes a light-transmitting portion forming part of the observation facility and permitting visual determination of the at least one characteristic of the supply of softening agent in the chamber.

The machine further comprises a housing for the vessel, receptacle and conveying means. The softening means can further comprise a support which is movably installed in the housing and defines the aforementioned chamber for the supply of softening agent. The support is movable to and from an operative position in which the chamber communicates with the outlet so that tap water flowing from the vessel is softened on its way toward the receptacle and preferably in or in immediate proximity of the outlet in order to avoid deposition of scale in the conveying means. The observation facility is mounted on and is movable with the support. The housing can be provided with guide means and the support can be provided with follower means serving to track the guide means and to thus confine the support to movements along a predetermined path with reference to the housing. The support and the housing can further comprise cooperating detent means for releasably holding the support in at least one predetermined position (for example, in the aforementioned operative position) with reference to the housing.

The conveying means can comprise a first conduit which receives softened water from the softening means, a second conduit which receives softened water from the first conduit, and a third conduit (such as a riser) which conveys water from the second conduit to the receptacle. The aforementioned heating means is preferably arranged to heat water in the second conduit. The receptacle is provided with at least one outlet for hot beverage, and the machine can further comprise means (e.g., a warming plate in or on the housing) for supporting a beverage collecting vessel beneath the outlet or outlets of the receptacle.

The vessel an be separably installed in the housing and can be provided with a first coupling element which can cooperate with a second coupling element on the conveying means to ensure that tap water can flow from the outlet of the vessel into the conveying means. Such coupling elements are preferably provided in the region of the outlet of the vessel, and the supply of softening agent can be provided in one of the coupling elements. The softening means for use in such machine can further comprise a puncturable envelope of metallic or plastic foil or the like which surrounds the supply of softening agent. At least one of the coupling elements is then provided with suitable means for puncturing the envelope in response to connection of the vessel to the conveying means. As a rule, or at least in many instances, both coupling elements will be provided with puncturing means to thus ensure that the envelope will establish a path for the flow of water into contact with the supply of softening agent as well as for the flow of softened water out of the envelope and into the conveying means.

Alternatively, the softening means can comprise a refillable container which is insertable into and withdrawable from the one coupling element.

The supply of softening agent can consist of suitably compacted softening agent, and such softening means can further comprise a water-permeable container which serves to receive and to be filled or nearly filled by the supply of compacted softening agent.

If the vessel is dispensable, the softening means can be integrated into the dispensable vessel so that it can be discarded whenever the user of the machine decides to discard the vessel.

Still further, the softening means can comprise a cartridge which contains a requisite supply of softening agent and is removably installed in the path of water flow from the vessel into the receptacle.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1a is an enlarged view of a detail in the lower left-hand portion of FIG. 1;

FIG. 3 is a fragmentary exploded view of a second machine wherein the supply of softening agent is confined in a puncturable envelope;

FIG. 4 shows a refillable cartridge which contains a supply of softening agent; and FIG. 5 illustrates a portion of a further machine which uses a dispensable water-storing vessel with a supply of water softening agent in the interior of the vessel.

DESCRIPTION OF PREFERRED EMBODIMENTS

Figure 1:
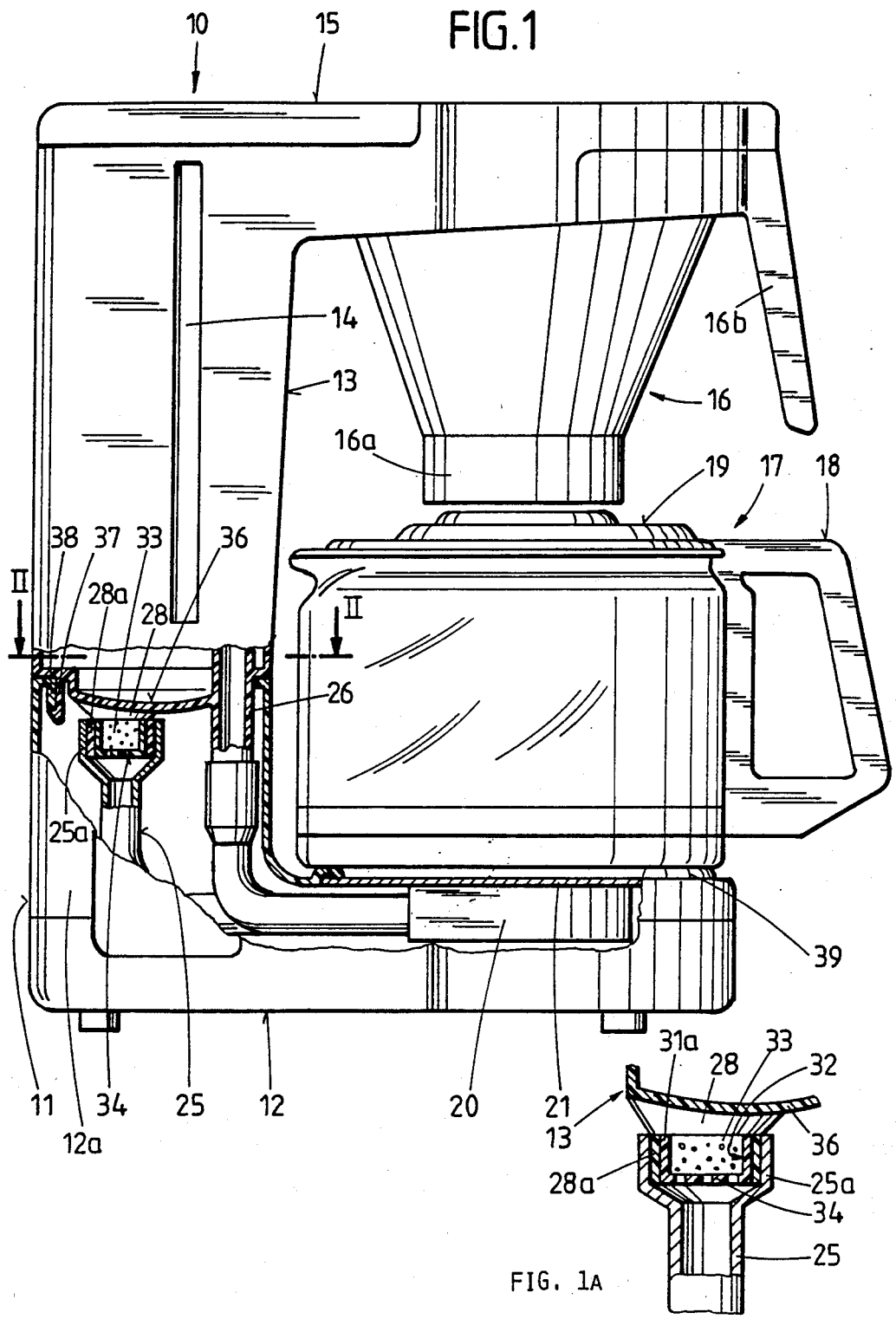
FIG. 1 is a schematic partly elevational and partly vertical sectional view of an electric coffee making machine which embodies one form of the invention and wherein the supply of softening agent is confined in a container at one end of a support which is removably installed in the housing of the coffee making machine.
Figure 2:
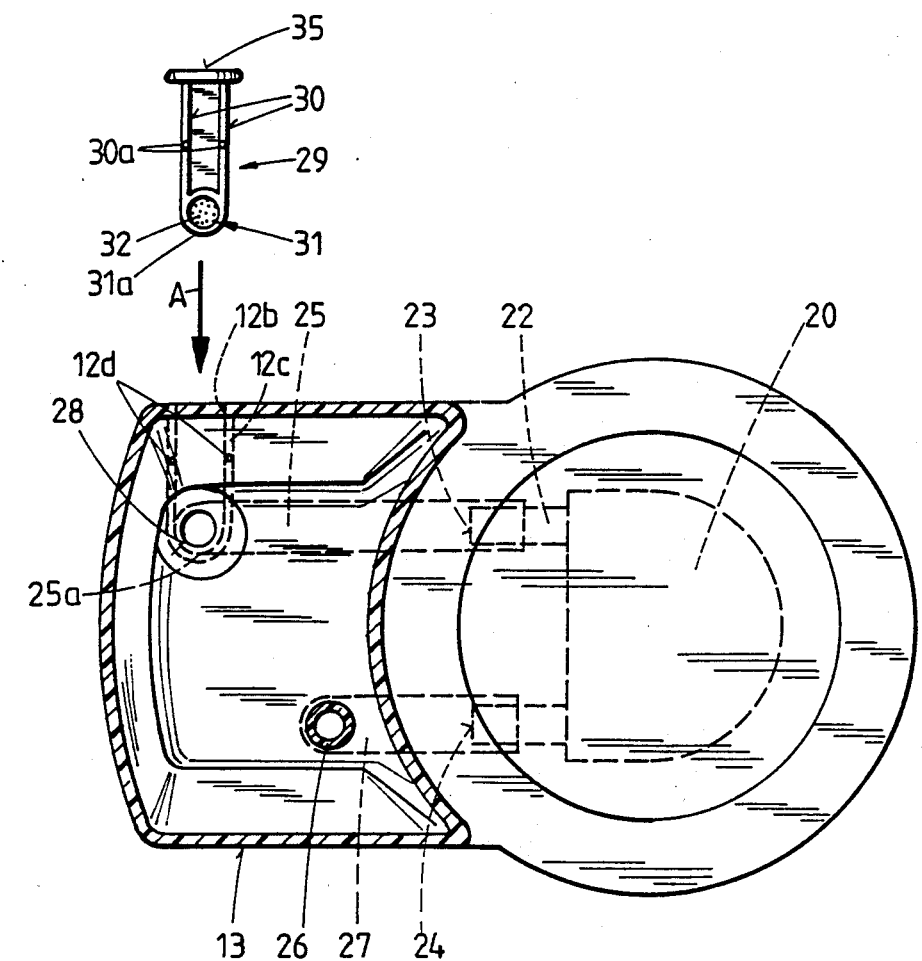
FIG. 2 is a fragmentary horizontal sectional view substantially as seen in the direction of arrows from the line II—II of FIG. 1 and shows the support for the supply of softening agent and for the observation facility in detached position adjacent the housing of the coffee making machine.

Referring to FIGS. 1 and 2, there is shown an electric coffee making machine 10 which embodies one form of the invention. FIGS. 1 and 2 show only those parts of the improved machine which are necessary for an understanding of the invention. Thus, the means for connecting the current-consuming parts of the machine to a suitable source of electrical energy, the circuitry in the housing 11 of the machine, the signal lamps, the switches and other actuating and control elements are omitted in FIGS. 1 and 2 for the sake of clarity. All such parts which are omitted in FIGS. 1 and 2 but are necessary for operation of the improved machine can be of the type as used in certain conventional electric coffee makers, e.g., in the coffee/tea maker of the type known as "Coffee Time" $165 and "Coffee Aroma" # 164, both manufactured and distributed by the assignee of the present application.

The housing 11 of the illustrated machine 10 is made of an electrically insulating material and has a substantially L-shaped outline with an upstanding portion 12a and a horizontal portion or leg 12. The underside of the leg 12 is provided with suitable feet and can rest directly on a supporting surface, such as the upper side of a table or counter top. The relatively short upstanding portion 12a of the housing 11 carries an elongated upright vessel 13 which can store a supply of fresh water, such as tap water, and has a bottom wall 36 provided with an outlet 28 (FIG. 2) for the outflow of a stream of water into contact with a supply 33 of softening agent. The bottom wall 36 of the vessel 13 is further provided with one or more downwardly extending integral claw-shaped connecting members 37 which cooperate with complementary connecting members 38 of the upstanding portion 12a of the housing 11 to releasably secure the vessel 13 to the housing. The connecting members 37 and/or 38 can be deformed in order to permit detachment and renewed attachment of the vessel 13 so that the latter can be separated from the housing 11 for the purpose of discarding it or of refilling it with a fresh supply of tap water. The vessel 13 can be made of an opaque material or of a light-transmitting material so that the user of the machine 10 can observe the quantity of fresh water in the interior of the vessel. The illustrated vessel 11 is made of a single piece of opaque plastic or other (e.g., vitreous) material and has an elongated upright window 14 which enables the person in charge to observe the quantity of fresh water therein. The window 14 extends substantially all the way from the bottom wall 36 to the top wall 15 of the vessel 13. The top wall 15 is detachable from the main portion of the vessel 13, or is provided with a sealable closure, to permit refilling of the vessel, either by moving the entire machine 10 beneath a water tap or by detaching the vessel 13 from the housing 11 prior to moving the detached vessel beneath a source of fresh water.

The housing 11 of the machine 10 further supports a funnel-shaped receptacle 16 which constitutes a filter holder and is adjacent the upper portion of the vessel 13. This receptacle can receive a bag which consists of filter paper and can contain a requisite quantity of comminuted coffee beans or tea leaves, i.e., a flavoring agent which is to be contacted by hot water in order to produce a hot beverage which is discharged via outlet 16a into a coffee can 17 or another suitable vessel on a warming plate 39 at the top of the leg 12 of housing 11. The can 17 is or can be made of a light-transmitting plastic or vitreous material and has a handle 18 and a cover or lid 19 which can be designed to automatically open the outlet 16a when the can 17 assumes a predetermined position on the warming plate 39. A handgrip portion 16b of the receptacle 16 serves to facilitate detachment of the receptacle from the housing 11 for convenient replacement of a filter bag containing spent comminuted coffee beans or tea leaves with a fresh filter bag. The exact details of the receptacle 16 and can 17 form no part of the present invention. Reference may be had to numerous pending United States patent applications and to numerous granted United States Letters Patent of the assignee which fully describe and show all details of such parts in an electric coffee or tea making machine. The same holds true for the warming plate 39 and for a water consuming or processing device in the form of an electric heater 20. This heater is disposed beneath a detachable plate 21 which, in turn, is disposed beneath the warming plate 39.

As can be seen in FIG. 2, the electric heater 20 is designed to heat a stream of water flowing through a (second) conduit 22 receiving soft water from a (first) conduit 25 which receives water from the outlet 28 in the bottom wall 36 of the vessel 13. The discharge end of the conduit 22 is connected with the lower end portion of a third conduit 26 constituting a riser which delivers hot water and/or vapors into the receptacle 16 wherein the water and/or vapors contact the supply of flavoring agent (comminuted coffee beans or tea leaves) so that the heated liquid forms a beverage which can be dispensed into the can 17 by way of the outlet 16a and opening in the cover or lid 19. The heater 20 is disposed in a substantially horizontal plane and is installed in the interior of the leg 12 of the housing 11, the same as a portion of the conduit 25. The conduits 25, 22 and the riser or conduit 26 together constitute a conveying means which serves to deliver water from the outlet 28 of the vessel 13 to the receptacle 16 and to enable the stream of water to be heated during flow in the conduit 22. The latter preferably constitutes a pipe having a circular cross-sectional outline and being bent into a substantially U-shaped body so as to lengthen the path for the flow of the stream of tap water through the heater 20.

The intake end 23 of the conduit 22 is coupled to the discharge end of the conduit 25, and the discharge end 24 of the conduit 22 is coupled to the intake end 27 of the riser 26. The intake end 25a of the conduit 25 constitutes a first coupling element which is separably connected with a coupling element 28a forming part of the outlet 28a in the bottom wall 36 of the vessel 13 and which serves to deliver soft water from the supply 33 of softening agent into the conduit 22. The upper end portion of the riser 26 is substantially horizontal and has a discharge end which supplies heated water and/or water vapors into the receptacle 16 wherein the heated liquid contacts the flavoring agent.

The heater 20 preferably comprises a U-shaped pipe which surrounds and is preferably in large-area surface-to-surface contact with the U-shaped conduit 22 so as to ensure a highly satisfactory exchange of heat between the pipe of the heater 20 and the stream of water in the conduit 22. The pipe of the heater 20 can be welded, soldered or otherwise securely connected to the conduit 22. As mentioned above, the heater 20 can be of any conventional design (for example, it can comprise one or more thick film conductors as disclosed in several copending United States patent applications of the assignee), the same as the electric conductors, relays and switches which are used to connect the heater with an energy source as well as to regulate heating action of the heater.

In heretofore known electric coffee or tea making machines, water which is discharged by the vessel in or on the upright portion of the housing flows directly through the electric heater and thence into the receptacle for a supply of flavoring agent. This entails progressive clogging of the water conveying means with boiler scale to thus unnecessarily increase the energy requirements of the machine and to eventually lead to complete prevention of the flow of water toward, through and beyond the heater. Rapid clogging is particularly likely to occur if the vessel 13 is repeatedly filled with hard water, i.e., with water containing a relatively high percentage of sodium and/or magnesium salts. Progressive clogging prolongs the interval of time which is required to heat a predetermined quantity of water to a desired temperature because the transfer of heat between the heater (20) and a stream of water flowing through a conduit (22), the internal surface of which is coated with boiler scale, is much less satisfactory than if the conduit for the stream of water is devoid of scale. In accordance with the invention, the stream of water which issues from the outlet 28 in the bottom wall 36 of the vessel 13 must flow through the supply 33 of softening agent before it can enter the first conduit 25 of the means for conveying water into the receptacle 16. This reduces the likelihood of accumulation of boiler scale along the internal surfaces of the conduits 25, 22 and 26 and thus enhances the useful life of the entire machine while simultaneously ensuring that a predetermined quantity of water (e.g., ten or twelve cups) is heated within an anticipated interval of time and with the consumption of a relatively small amount of electrical energy.

The upwardly extending portion 12a of the housing 11 is provided with an opening 12b for an intermediate portion of an elongated support 29 one end portion of which carries a container 31 for the supply 33 of softening agent and the other end portion of which carries an observation facility 35 in the form of a window enabling a person in charge to observe a characteristic (particularly the color) of the supply 33 in the container 31. To this end, at least a portion of the circumferential wall 31a of the container 31 is made of a light-transmitting material so that a person looking through the window 35 can determine the changes of the characteristic, such as the color, of the softening agent 33 in the container 31. If the color is indicative that the softening agent has lost its ability to soften the stream of water flowing from the vessel 13 toward and into the conduit 25, the support 29 is extracted from the housing portion 12a and the supply 33 of softening agent is replaced with a fresh supply before the support 29 is reinserted into the housing portion 12a. The arrow A indicates in FIG. 2 the direction in which the support 29 can be reinserted into the housing portion 12a after the container 31 has received a fresh supply 33 of softening agent. The bottom wall 32 of the container 31 constitutes a liquid-permeable filter or sieve which permits soft water to flow into the conduit 25. The wall 31a is preferably a cylindrical wall which carries the permeable bottom wall 32 and is made, either entirely or in part, of a light-transmitting plastic or other suitable material. The support 29 has two spaced-apart parallel followers 30 which track complementary guides 12c in the housing portion 12a to ensure that the properly inserted support can move along a predetermined path to and from the operative position which is shown in FIG. 1 and in which the supply 33 of softening agent is located in the path of flow of tap water from the outlet 28 into the conduit 25 and thence into the conduit 22. The supply 33 preferably constitutes a condensed body of softening agent which completely or nearly completely fills the chamber 32 of the container 31 above the permeable bottom wall 34. Prefabricated pellets or cartridges of softening agent can be supplied with the improved machine 10 to be inserted into the chamber 32 of the container 31 when an observation of the supply 33 in the container indicates that a replacement of the supply of softening agent is warranted or necessary.

The window 35 of the observation facility for the supply 33 of softening agent in the chamber 32 of the container 31 can constitute a prefabricated unit which is glued and/or otherwise properly affixed to the respective (outer) end portion of the support 29. Such window 35 can be made of a transparent plastic or vitreous material. As mentioned above, that portion of the wall 31a which is disposed between the supply 33 of softening agent and the window 35 is also made of a light-transmitting (e.g., fully transparent) plastic or other material in order to permit an observation of the supply 33 whenever desired by the operator of the machine 10. The guide means 12c of the housing portion 12a can constitute or include grooves for the rail- or rib-shaped followers 30 of the support 29. The followers 30 can be provided with projections 30a which constitute male detent elements and cooperate with suitable complementary female detent elements 12d of the guide means 12c to releasably hold the support 29 in at least one predetermined position, e.g., in the operative position of FIG. 1 in which the supply 33 of softening agent is located in the path of flow of hard water from the outlet 28 in the bottom wall 36 of the vessel 13 into the conduit 25. The male detent elements 30a can be expelled from the respective female detent elements 12d in response to exertion of sufficient pull or push upon the support 29.

The supply 33 of softening agent ensures that the conduit 25, the conduit 22, the riser 26 and the receptacle 16 receive softwater so that the means for conveying water from the vessel 13 into contact with the flavoring agent in the receptacle 16 cannot be clogged with scale.

The entire support 29 can be made of a single piece of inexpensive plastic material, and the followers 30 and/or the male detent elements 30a need not be finished at all or require a minimum of finish. The same applies for the guides 12c behind the opening 12b of the housing portion 12a. The male detent elements can be provided on the guides 12c and the female detent elements are ten provided in the followers 30.

The heater 20 is preferably provided with means for maintaining the temperature of the warming plate 39 within a desired range so as to prevent excessive cooling of the beverage in the can 17, at least for a selected interval of time following dispensing of the beverage from the receptacle 16 into the can 17. Such heating means for the warming plate of a coffee or tea making machine are well known in the art, and certain types of such heating means are described in several pending United States patent applications of the assignee of the present application.

Instead of receiving a body of condensed or compacted softening agent, the container 31 at the inner end of the support 29 can receive a supply of loose softening agent. The openings in the bottom wall 34 should be sufficiently small to retain the particles of softening agent but such openings should permit soft water to flow at the required rate into the conduit 25 on its way into the conduit 22, i.e., into the range of the electric heater 20.

The supply 33 of softening agent can be confined in an envelope 133 (FIG. 3) which is made of metallic foil, plastic foil or any other suitable inexpensive material. Such envelope can be provided with holes to permit penetration of hard water into contact with softening agent as well as the flow of soft water from the envelope into the conduit 25. If the envelope 130 is supplied without holes, the coupling element 25a and/or 36a can be provided with a set of needles or other suitable puncturinq or perforating tools which puncture or perforate the respective walls of the envelope in response to attachment of the vessel 13 to the conduit 25. This is also shown in FIG. 3 wherein the puncturing tools in the coupling element 36a are shown at 136a and the puncturing tools in the coupling element 25a are shown at 125a. An advantage of the envelope 133 is that it facilitates predictable insertion of a supply of softening agent into the respective coupling element as well as convenient evacuation of spent softening agent from the machine. At least a portion of the envelope 133 can be made of a light-transmitting material so as to enable a person looking through the observation facility (not shown in FIG. 3) to ascertain the color and/or other characteristics of the supply of softening agent in the envelope so that an envelope with a supply of spent softening agent can be replaced in good time. The observation facility of the machine which embodies the structure of FIG. 3 can be permanently installed in the housing 11 for the conduit 25.

FIG. 4 shows a refillable cup-shaped cartridge 231 which can receive a supply 233 of loose softening agent. Such cartridges are available on the market in different sizes and shapes. The cartridge 231 can be inserted into the coupling element 25a in the machine 10 of FIGS. 1 and 2 in lieu of the compacted supply 33 or in lieu of the envelope 133. All that is necessary is to design the container 31 or the coupling element 25a in such a way that it can accept a commercially available refillable cartridge.

The improved machine and/or its water softening means can be modified in a number of additional ways without departing from the spirit of the invention. For example, the machine can be designed for the brewing of tea or it can be designed for the making of coffee or tea. Combined coffee and tea makers which can be equipped with the novel water softening means are manufactured by the assignee of the present application and three of such combined coffee and tea makers are known as "Brewmaster #150, Brewmaster II #158 and "Brewmaster Jr. #170. The construction of the heater 20 can also be modified in a number of ways, as long as the heater is capable of heating water at the required rate while the water flows from the vessel which contains fresh water to the locus where heated water comes in contact with the flavoring agent.

Still further, the water softening means can be embodied in a dispensable (throw-away) vessel for fresh water. This is shown in FIG. 5 which illustrates a dispensable water vessel 61 of the type shown in FIG. 9 of the copending patent application Serial No. This vessel has a compartment or chamber 62 which is disposed above a perforated bottom wall 63 and is surrounded by a wall 48 constituting a male coupling element insertable into a female coupling element 51 having an outlet leading into the conduit 25. The male coupling element 48 can be releasably held in the female coupling element 51 by friction and constitutes an outlet which receives a brick- or block-shaped supply 64 of softening agent.

The supply 64 can be inserted into the compartment 62 in response to detachment or lifting of a cover or lid 69 at the top of the vessel 61. When the body of liquid in the vessel 61 is evacuated by way of the openings in the bottom wall 63 of the male coupling element 48, the vessel 61 can be refilled on lifting or upon complete detachment of the cover 69, or the vessel can be discarded with the supply 64 of softening agent in the compartment 62. The supply 64 preferably contains adequately compacted softening agent so that it can retain its shape during insertion into the compartment 62, and such supply is preferably shaped and dimensioned to at least substantially fill the compartment 62 so as to prevent hard water from bypassing the supply of softening agent on its way into the openings of the bottom wall 63. The vessel 61 can be made of an inexpensive plastic or other material and can constitute a thin-walled tank which is mass-produced in a blow molding or other suitable machine. The vessel 61 can be supplied in a plastic or other envelope which prevents the supply 64 of softening agent in the compartment 62 from coming in contact with moisture before the male coupling element 48 is inserted into the female coupling element 51 of the conduit 25 in the housing of the coffee or tea making machine. The machine which embodies the structure of FIG. 5 preferably also comprises an observation facility. At least a portion of the outlet 48 then transmits light so as to permit visual observation of the supply 64 in the compartment 62.

The vessel 61 is in part a functional equivalent of the envelope 133 of FIG. 3 because it serves as a means for confining a supply of softening agent prior to insertion of such supply into the path of the flow of water from the interior of the vessel into the conduit 25. When the cover 69 is in place and the vessel 61 is not filled with water, and when such vessel is confined in a plastic envelope, the supply 64 of softening agent in the compartment 62 is adequately sealed from contact with moisture for any desired interval of time. The vessel 61 can be made of a light-transmitting material so that the water level indicator 14 of FIG. 1 can be dispensed with.

The maker of the machine will select the nature of the means for confining the water softening agent in dependency upon a number of factors, such as the availability of refills (133), compacted supplies (64) of softening agent or supplies of loose softening agent (233), the availability of space for the water softening means in an otherwise conventional machine and the estimated cost of the machine. In many instances, the maker of the machine will select to employ a refillable container (231) for water softening agent so that the supply of such agent can be replenished as often as desired or necessary. It is normally preferred to avoid introduction of loose softening agent directly into a part of the machine because it is much simpler to replace a supply of spent or partially spent softening agent which is confined in an envelope, in a cup or another container. An envelope or a small cup-like container can be mass-produced at a minimal cost. Spent softening agent might not be readily removable from certain portions of a chamber through which water flows on its way toward the heater if the softening agent is simply dumped into such chamber without resorting to an envelope, a cup or a like container.

An important advantage of the improved machine is that the supply of softening agent prevents untreated water from coming in contact with those parts (such as the conduits 25, 22 and the riser 26) which are likely to be clogged with boiler scale. This is achieved by the simple expedient of installing the supply of softening agent in the path of the flow of water from the vessel 13 or 61 into the receptacle 16 in the region of the outlet 28 or 48 of the vessel, i.e., in the vessel itself (FIG. 4) or immediately downstream of the outlet (28).

Another important advantage of the improved machine is that the need for decalcification can be ascertained in a simple and inexpensive way, i.e., without resorting to thermostats, electronic clocks and like previously proposed parts which contribute significantly to complexity and cost of the machine and render the machine prone to malfunction. As mentioned above, the machine can receive prefabricated commercially available refill cartridges or throw-away supplies of water softening agent to thus even further reduce the cost and ensure that spent supplies of softening agent can be replaced with fresh supplies as often as desired and at a minimal cost. The cost of replenishing the softening agent is reduced still further if the container for softening agent is refillable, e.g., in a manner as described in connection with FIGS. 1 and 2 or as shown in FIG. 4 (by the simple expedient of extracting the support 29 from the housing portion 12a or by removing the container 231 from 31 or 25a). The vessel of the improved machine can receive very hard water without risking premature clogging of the means for conveying water to the receptacle for flavoring agent. The machine can be furnished with simple instructions to the operator, i.e., with instructions to observe the color of the supply of softening agent and to replace the supply when the color of the softening agent in the region of the outlet of the vessel for fresh water is indicative that the softening agent can no longer perform its water softening function.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An electric machine for making hot beverages, such as coffee and tea, comprising a vessel arranged to store a body of water, such as magnesium- and/or calcium-containing tap water, said vessel having a water outlet; a receptacle arranged to contain a flavoring agent; means for conveying water from said outlet to said receptacle so that the thus conveyed water contacts the flavoring agent; at least one water processing device arranged to receive water from said outlet; and means for softening water in the region of said outlet so that said at least one water processing device receives only softened water.

2. The machine of claim 1, wherein said at least one water processing device comprises means for heating water intermediate said vessel and said receptacle.

3. The machine of claim 1, wherein said water softening means includes a supply of water softening agent which is contacted by water in the region of said outlet and the composition of which is such that at least one of its characteristics, particularly its color, changes when its water softening capacity is reduced or exhausted, and further comprising an observation facility for the supply of water softening agent.

4. An electric machine for making hot beverages, such as coffee and tea, comprising a vessel arranged to store a body of water, such as magnesium- and/or calcium-containing tap water, said vessel having a water outlet; a receptacle arranged to contain a flavoring agent; means for conveying water from said outlet to said receptacle so that the thus conveyed water contacts the flavoring agent; means for softening water in the region of said outlet, including a supply of water softening agent which is contacted by water in the region of said outlet and the composition of which is such that at least one of its characteristics, particularly its color, changes when its water softening capacity is reduced or exhausted; and an observation facility for the supply of water softening agent.

5. The machine of claim 4, wherein said facility has means for permitting visual determination of said one characteristic.

6. The machine of claim 4, wherein said softening means comprises a chamber for the supply of softening agent, said chamber being disposed beneath and communicating with said outlet, said softening means further comprising a filter adjacent said chamber and defining a path for the flow of softened water toward said receptacle.

7. The machine of claim 6, wherein said softening means further includes wall means surrounding said chamber, said wall means including a light-transmitting portion forming part of said observation facility and permitting visual determination of said one characteristic of the supply of softening agent in said chamber.

8. The machine of claim 4, further comprising a housing for said vessel and said receptacle, said softening means further comprising a support which is movably installed in said housing and defines a chamber for the supply of softening agent, said support being movable to and from an operative position in which said chamber communicates with said outlet so that water flowing from said vessel is softened on its way toward said receptacle.

9. The machine of claim 8, wherein said observation facility is provided on and is movable with said support.

10. The machine of claim 8, wherein said support is elongated and includes a first end portion provided with said chamber and a second end portion carrying said observation facility.

11. The machine of claim 8, wherein said housing has guide means and said support has follower means tracking said guide means so as to confine said support to movements along a predetermined path with reference to said housing.

12. The machine of claim 11, wherein said support and said housing comprise cooperating detent means for releasably holding the support in at least one predetermined position relative to said housing.

13. The machine of claim 4, wherein said conveying means comprises a first conduit which receives softened water from said softening means, a second conduit which receives softened water from said first conduit, and a riser which conveys water from said second conduit to said receptacle, and further comprising electric means for heating water in said second conduit.

14. The machine of claim 13, wherein said receptacle has an outlet for hot beverage, and further comprising means for supporting a beverage collecting vessel beneath the outlet of said receptacle.

15. The machine of claim 4, further comprising a housing for said vessel and said conveying means, said vessel being separably installed in said housing and said vessel and said conveying means comprising cooperating first and second coupling elements disposed in the region of said outlet and arranged to separably connect the vessel to said conveying means, said supply of softening agent being disposed in one of said coupling elements.

16. The machine of claim 15, wherein said softening means further comprises a puncturable envelope for the supply of softening agent, at least one of said coupling elements having means for puncturing the envelope in response to connection of the vessel to said conveying means.

17. The machine of claim 16, wherein each of said coupling elements comprises means for puncturing said envelope.

18. The machine of claim 15, wherein said softening means further comprises a refillable container for softening agent, said container being insertable into and withdrawable from said one coupling element.

19. The machine of claim 4, wherein said supply consists of compacted softening agent and said softening means further comprises a water-permeable container which is arranged to receive and to be filled by the supply of compacted softening agent.

20. The machine of claim 4, wherein said vessel is dispensable and said softening means is integrated into said vessel.

21. The machine of claim 4, wherein said softening means comprises a cartridge which contains said supply of softening agent and is removably installed in the path of water flow from said vessel into said receptacle.

22. An electric machine for making hot beverages, such as coffee and tea, comprising a vessel arranged to store a body of water, such as magnesium- and/or calcium-containing tap water, said vessel having a water outlet; a receptacle arranged to contain a flavoring agent; means for conveying water from said outlet to said receptacle so that the thus conveyed water contacts the flavoring agent; means for softening water in the region of said outlet, including a supply of water softening agent which is contacted by water in the region of said outlet and the composition of which is such that at least one of its characteristics changes when its water softening capacity is reduced or exhausted; and means for facilitating determination of the changes of said at least one characteristic of the softening agent.

* * * * *